(12) United States Patent
Stegelmann (10) Patent No.: US 6,758,925 B1
(45) Date of Patent: *Jul. 6, 2004

(54) ACOUSTICAL ENERGY TRANSFER COMPONENT

(75) Inventor: Norman R. Stegelmann, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/326,328

(22) Filed: Dec. 20, 2002

(51) Int. Cl.[7] .............................................. B29C 65/08
(52) U.S. Cl. ...................... 156/73.1; 156/228; 156/555; 156/580.2; 156/582
(58) Field of Search .............................. 156/73.1, 228, 156/555, 580, 580.1, 580.2, 582, 583.1

(56) References Cited

U.S. PATENT DOCUMENTS

| | | | |
|---|---|---|---|
| 4,351,858 A | 9/1982 | Hunold et al. | |
| 4,921,666 A | 5/1990 | Ishii | |
| 4,983,339 A | 1/1991 | Boncoeur et al. | |
| 5,087,320 A | 2/1992 | Neuwirth | |
| 5,096,532 A | 3/1992 | Neuwirth et al. | |
| 5,110,403 A | 5/1992 | Ehlert | |
| 5,190,603 A | 3/1993 | Nazmy et al. | |
| 5,552,013 A | 9/1996 | Ehlert et al. | |
| 5,562,790 A | 10/1996 | Ehlert et al. | |
| 5,645,681 A | 7/1997 | Gopalakrishna et al. | |
| 5,817,199 A * | 10/1998 | Brennecke et al. | 156/73.1 |
| 5,976,316 A | 11/1999 | Mlinar et al. | |
| 5,994,818 A | 11/1999 | Abramov et al. | |
| 6,059,923 A | 5/2000 | Gopalakrishna | |
| 6,287,403 B1 * | 9/2001 | Couillard et al. | 156/73.1 |
| 6,454,890 B1 * | 9/2002 | Couillard et al. | 156/73.1 |

FOREIGN PATENT DOCUMENTS

| | | |
|---|---|---|
| CN | 1229016 | 9/1999 |
| JP | 09316572 | 12/1997 |
| JP | 2002096024 | 4/2002 |

OTHER PUBLICATIONS

International Search Report from PCT/US 03/16497 dated Sep. 23, 2003.

* cited by examiner

Primary Examiner—James Sells
(74) Attorney, Agent, or Firm—Senniger, Powers, Leavitt & Roedel (57) ABSTRACT

An acoustical energy transfer component for transporting acoustical energy, the component having a shaped metal component body having a substantially uniformly isotropic expansion and contraction amplitude upon acoustical excitation. A method of manufacturing an acoustical energy transfer component having a component body with a uniformly isotropic expansion and contraction amplitude upon acoustical excitation.

29 Claims, 7 Drawing Sheets

ACOUSTICAL ENERGY TRANSFER COMPONENT

BACKGROUND OF INVENTION

This invention relates to an acoustical energy transfer component for any of a variety of applications to transfer input acoustical energy to an output location.

Acoustical energy transfer components are used in a wide variety of applications such as, but not limited to, radar, ultrasonic cleaning, waveguides, ultrasonic bonding, ultrasonic perforating, and ultrasonic cutting. Among examples are an ultrasonic horn, booster, and converter used in bonding two thermoplastic sheets of material together in the manufacture of personal care products such as diapers. Another example is an acoustic biosensor for deployment at an implantation site. Another example is a piezoelectric acoustic component used as a piezoelectric buzzer or a piezoelectric receiver that generates an alarm sound or an operating sound in electronic equipment, household electrical appliances, or mobile telephones. Another example is apparatus for acoustic pressure assisted wave soldering of components onto printed circuit boards. Another example is an ultrasonic endoscope.

Upon energization acoustic energy transfer components cyclically expand and contract. For example, an ultrasonic horn for bonding may expand and contract a total amplitude of 0.003 inches (0.0075 cms) at a frequency of 20,000 Hz. This translates to a total movement of 120 inches (300 cms) of movement per second. This movement corresponds to an energy value applied to the work piece. Some of the energy is simply returned as elastic reaction, and most of the energy is dissipated as heat, which melts the two materials being bonded.

Generally, acoustical energy transfer components have been manufactured by machining a final component shape from forged bar stock, such as titanium bar stock. Forging by its nature mechanically deforms grains, yielding a wrought microstructure. The alignment of deformed grains according to a wrought microstructure affects the natural cyclic bulk expansion and contraction of the component as it is energized. In particular, the natural expansion and contraction is orthotropic or non-isotropic, that is, it is not uniform in all directions, and is preferential in one or more directions. The expansion and contraction in various directions is affected by the directional alignment of grains in the microstructure.

Inasmuch as a forged component expands and contracts non-uniformly, the degree of expansion and contraction in a given direction varies slightly depending on how the grains are aligned with respect to the component. As such, there are directions of maximum expansion and contraction, directions of minimum expansion and contraction, and directions of intermediate expansion and contraction. This type of non-uniform acoustical behavior can be undesirable. With ultrasonic rotary horns for bonding, for example, the horn is continually rotating, such that some products are bonded with the horn in a rotary position of maximum expansion and contraction, other products are bonded with the horn in a rotary position of minimum expansion and contraction, and other products are bonded with the horn in a rotary position of intermediate expansion and contraction. The amount of energy transferred to respective work pieces therefore varies, and non-uniform bonding or other work can result.

For many acoustical energy transfer components, resonant operating frequency is a critical parameter. In particular, for a given application such as radar, cleaning, or ultrasonic bonding, efficient operation requires that the component resonate at a predetermined, known frequency. With a horn, for example, this resonant operating frequency is largely dependent on the outside diameter of the horn. As a general proposition, as the size of the component is reduced, in many applications, the resonant frequency increases. However, not all forged components of the same size have the same resonant operating frequency, because resonant operating frequency is also largely dependent on the microstructure of the component. And because wrought microstructures vary substantially in terms of grain size and grain alignment from one forging to the next, there is a corresponding variance from one forging to the next in terms of resonant operating frequency, even for forgings of the same size. As such, just because a first forging of a given size is determined to have a resonant operating frequency of 20,000 Hz does not mean that a second forging of the same size will also have a resonant operating frequency of 20,000 Hz. This is especially true of forgings from distinct billets having distinct microstructures. Each forging must be separately tuned to the desired frequency. In order to tune a component to, for example, 20,000 Hz, the practice has been to produce the component slightly oversized and then machine the component progressively smaller until the frequency of 20,000 Hz is achieved.

SUMMARY OF THE INVENTION

In response to the above difficulties and problems, the invention provides an acoustical energy transfer component which has isotropic expansion and contraction characteristics upon acoustical excitation. The invention also provides an acoustical energy transfer component for which the need for tuning is substantially reduced or eliminated.

Briefly, therefore, the invention is directed to an acoustical energy transfer component for transporting acoustical energy comprising a shaped metal component body having a substantially uniformly isotropic expansion and contraction amplitude upon acoustical excitation.

The invention is also directed to a method for manufacturing an acoustical energy transfer component for transporting acoustical energy. The method comprises mechanically pressing metal powder into a component body preform; and hot isostatically pressing the component body preform to consolidate the metal powder to form a shaped metal component body having a uniform isotropic microstructure characterized by randomly isotropic directional grain alignment such that the component body has a uniformly isotropic expansion and contraction amplitude upon acoustical excitation.

Other features and advantages will be in part apparent and in part pointed out hereinafter.

DETAILED DESCRIPTION OF THE INVENTION

The present invention provides an acoustical energy transfer component for any of a variety of applications such as, but not limited to, radar, ultrasonic cleaning, waveguides, ultrasonic bonding, ultrasonic perforating, and ultrasonic cutting. Among examples are an ultrasonic horn, boosters, and converter used in bonding two thermoplastic sheets of material together in the manufacture of personal care products such as diapers. Another example is an acoustic biosensor for deployment at an implantation site. Another example is a piezoelectric acoustic component used as a piezoelectric buzzer or a piezoelectric receiver that generates an alarm sound or an operating sound in electronic equipment, household electrical appliances, or mobile telephones. Another example is apparatus for acoustic pressure assisted wave soldering of components onto printed circuit boards. Another example is an ultrasonic endoscope.

Turning to one example, the component of the invention is an ultrasonic rotary horn, such as for bonding at least two continuously moving substrate webs together. The horn can be a component of an overall assembly particularly useful for ultrasonically bonding selected components to absorbent articles. Alternatively, the horn and assembly are useful for bonding two webs together to form a composite material and subsequently using it as a component in an absorbent article such as, for example, a disposable diaper.

This embodiment of the present invention is particularly useful in the bonding of two or more layers of materials which preferably are made, at least in part, from thermoplastic polymers. In particular, the ultrasonic rotary horn and assembly can be used to ultrasonically bond stretchable outer ears to a disposable diaper using an ultrasonic rotary horn. The stretchable outer ears enhance the fit of the diaper about the waist of the wearer. The horn and assembly may also be used to bond a fastening system to the outer ears of the diaper. In addition, it should be readily understood that the horn and assembly may be used in the manufacture of other types of articles, such as, for example, training pants, feminine care products, incontinence garments, hospital gowns, and the like. All of such alternative configurations are contemplated as being within the scope of the present invention. The present invention may also be, for example, an ultrasonic rotary horn configured to selectively perforate a material, or to selectively cut shapes from a material.

Figure 1:
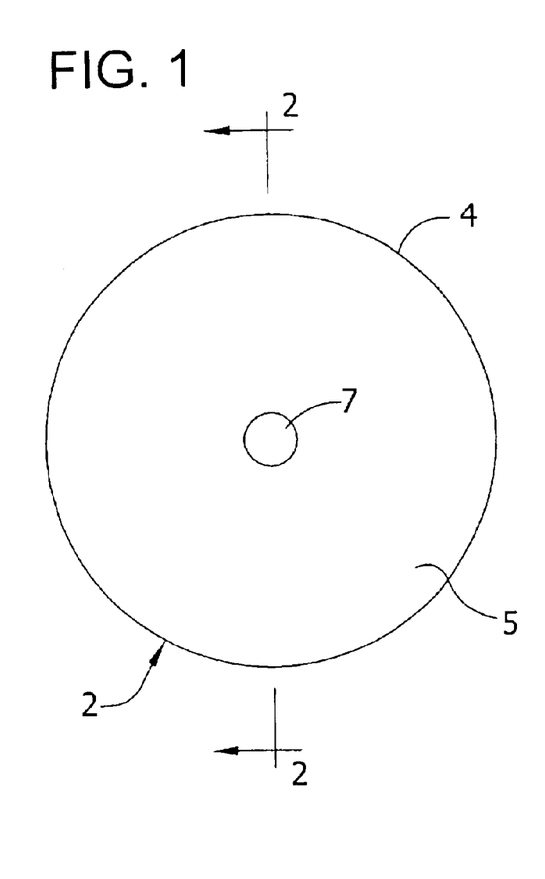
FIG. 1 is a schematic representation of an acoustical energy transfer component of the invention in plan view.
Figure 2:
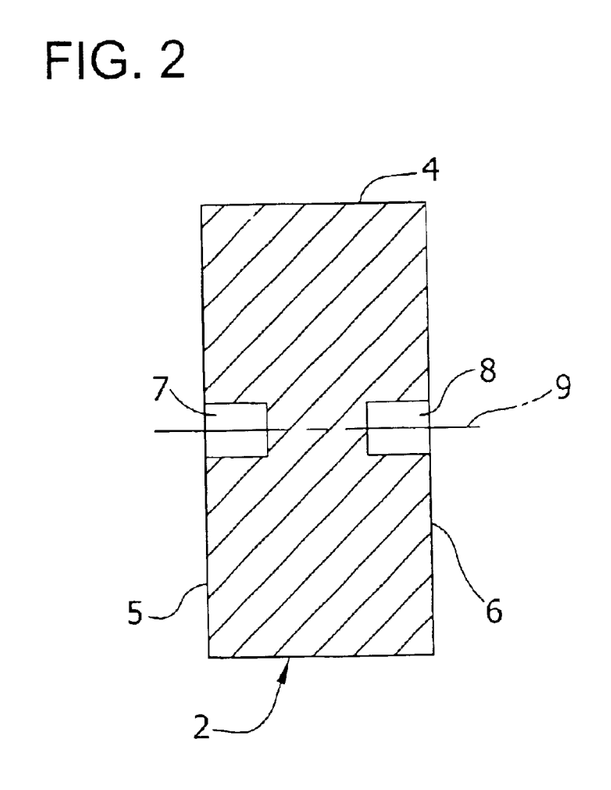
FIG. 2 is a cross sectional view taken along line 2—2 of FIG. 1.

In its simplest form the ultrasonic rotary horn embodiment of the invention is illustrated schematically in FIGS. 1 and 2. That is, the horn 2 can be a shaped solid metal horn body having a radial energy transfer surface 4, a first end 5, a second end 6, and a circular cross section as represented by first end 5. The ends have concentric cylindrical holes 7 and 8 centered about central axis 9. In general, the ultrasonic rotary horn 2 may be made from any metal having suitable acoustical and mechanical properties. Suitable metals include aluminum, monel, titanium, and some alloy steels. In one preferred embodiment the metal can be titanium-based material, such commercially pure titanium, or a titanium alloy (e.g., Ti6Al4V). Variables such as the diameter, mass, width, thickness and configuration of the ultrasonic rotary horn 2 or other component are not narrowly critical. However, physical variables do determine the particular frequency and amplitude at which the ultrasonic horn resonates and vibrates. In particular, the physical variables of an acoustic device, e.g., an ultrasonic horn, such as diameter, mass, thickness, overall configuration etc. may be selected such that the device resonates in a desired mode, i.e., a fundamental resonant mode under a given set of conditions, at a particular frequency and with a desired amplitude. For example, it is known that vibration in the desired mode at a desired frequency is achieved by adjusting physical parameters, and it is known that gain, i.e., ratio of output amplitude to input amplitude, can be adjusted by adjusting physical parameters.

Figure 3:
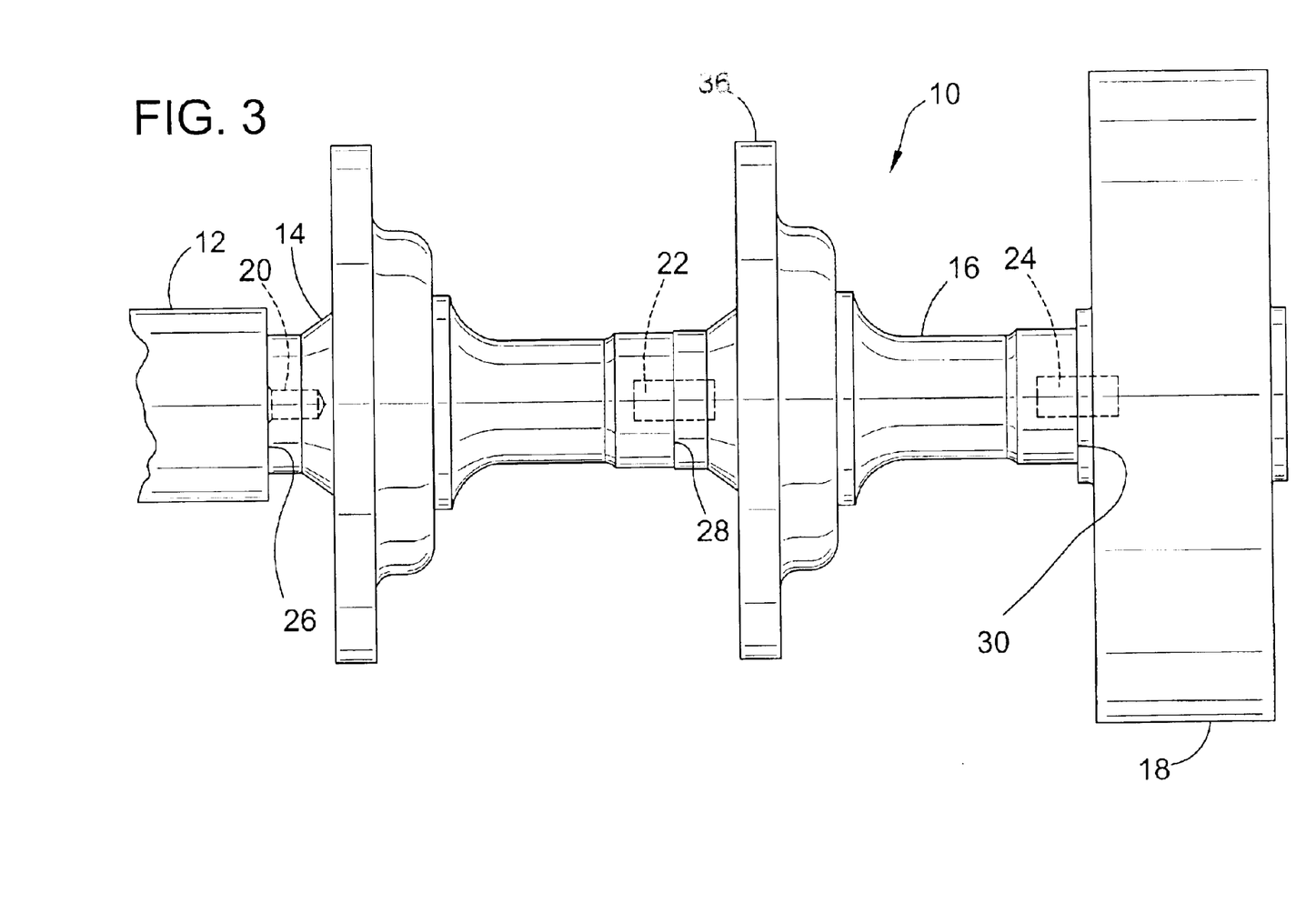
FIG. 3 is a schematic representation of an ultrasonic rotary horn assembly incorporating the acoustical energy transfer component of the invention.

FIG. 3 schematically illustrates an ultrasonic rotary horn assembly 10 having a number of stack components including a converter 12, a secondary booster 14, a primary booster 16, and a horn 18 formed in accordance with the invention. Connectors 20, 22, and 24 connect the various stack components at interfaces 26, 28, and 30. In one aspect these connectors are threaded studs of the type disclosed in co-pending, co-assigned U.S. patent application Ser. No. 10/287,310, the disclosure of which is incorporated herein by reference.

The ultrasonic rotary horn 18 in one embodiment can be intended to be excited at a frequency of from about 15 to about 60 kHz. The horn may have a diameter of from about 4 to about 20 centimeters and a width at the bonding surface of from about 0.6 to about 13 centimeters. The thickness of the horn at the rotational axis may be from about 0.06 to about 15 centimeters. The horn may have a mass in the range of from about 0.06 to about 30 kilograms. The diameter, width, and thickness of the horn are selected such that the horn, upon being excited by ultrasonic energy at a desired frequency, is adapted to resonate such that the excited end moves substantially in phase with the movement of the source of excitation and the opposed end and bonding surface move substantially out of phase with the excited end. Thus, upon subjecting the horn to ultrasonic excitation, the excited end moves in a direction towards the interior of the horn while the opposing end and the bonding surface move in the opposite direction which is also towards the interior of the horn. As such, the movements of the ends of the horn relative to each other are said to be out of phase.

The ultrasonic rotary horn assembly 10 also includes a drive mechanism or converter 12 to ultrasonically excite the ultrasonic horn 18. Any mechanism which provides the desired excitation can be used in the present invention. Such mechanisms are well known to those skilled in the art. For example, the assembly may include a drive mechanism that is commercially available from Dukane Corporation located in St. Charles, Ill. or a similar system available from Branson Sonic Power Company located in Danbury, Conn. Typically, a generator, such as a Dukane 3000 watt, 20 kHz generator (Part No. 20A3005), is connected to a driver assembly, such as a Dukane driver assembly (Part No. 110-3716-0001), to provide the necessary ultrasonic excitation. Any combination of boosters 14 and 16, such as a Dukane 1:1 booster (Part No. 110-2510) and a Dukane 1.5:1 booster (Part No. 110-2512), may then be attached to the driver assembly. The boosters function to amplify or otherwise modify the frequency. Finally, the ultrasonic horn is attached to the boosters. Thus, the combination of the generator, drive assembly, and boosters ultrasonically excites the ultrasonic horn 18, to thereby deliver the ultrasonic energy necessary to bond the substrate webs together, perforate a substrate, or otherwise carry out the desired operation.

The particular assembly illustrated may also include an anvil (not shown) with which the horn acts, with the work piece therebetween. The anvil may be a stationary anvil, or may optionally be a rotating anvil roll as in the case of a rotating ultrasonic horn as described in U.S. Pat. Nos. 5,087,320, 5,096,532, 5,110,403, and 5,552,013 (all hereby incorporated by reference). The rotating anvil roll has an outer peripheral anvil surface located adjacent the energy transfer surface 4 of the horn. The anvil roll can be configured to rotate about an anvil axis in a direction such that its bonding surface moves in the direction in which the work piece travels. In one specific bonding operation, substrate webs continuously move between the energy transfer face of the horn and the anvil.

Upon energization the acoustical energy transfer component cyclically expands and contracts, which expansion and contraction, in the instance of a horn, is the driving force for the bonding or other mechanical operation performed by the horn. For example, the horn expands and contracts a total amplitude of about 0.003 inches (0.0075 cms) at a frequency of about 20,000 cycles per second. This translates to a total movement of about 120 inches (300 cms) of movement per second. This movement corresponds to an energy value applied to the work piece traveling between the horn's energy transfer surface and the anvil. Some of the energy is simply returned as elastic reaction, and most of the energy is dissipated as heat, which melts two plastic materials being bonded. The horn body microstructure is characterized by directional alignment of grains which is random, and which is isotropic in that there is no preferential alignment in any direction or directions, such that the horn body uniformly expands and contracts in all radial directions upon excitation at a frequency between about 15 and about 60 kHz.

Figure 4:
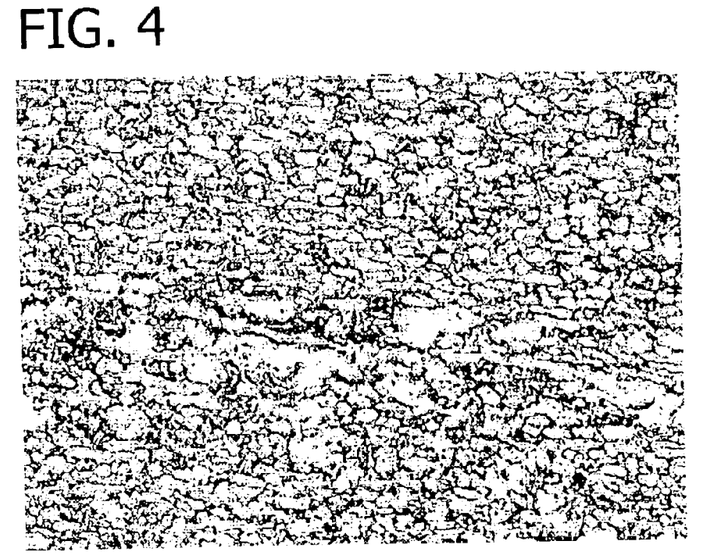
FIG. 4 is a photomicrograph taken at a magnification of 200× illustrating forged titanium microstructure.
Figure 5:
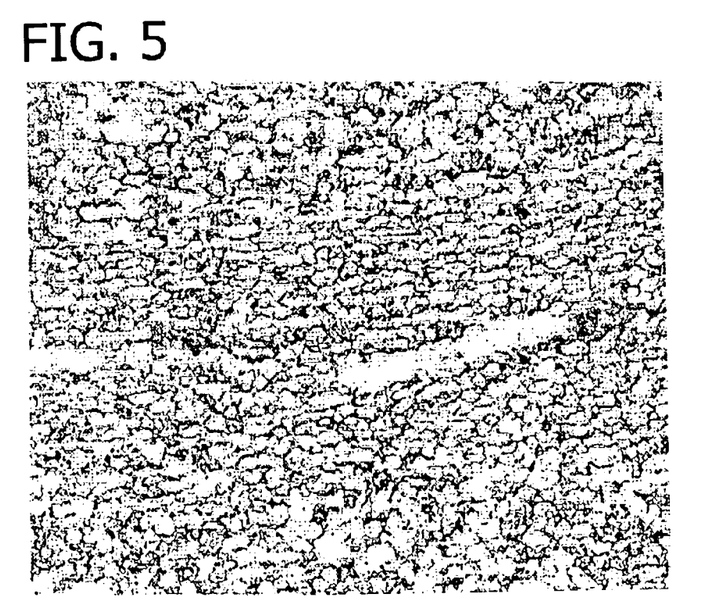
FIG. 5 is a photomicrograph taken at a magnification of 200× illustrating forged titanium microstructure.
Figure 6:
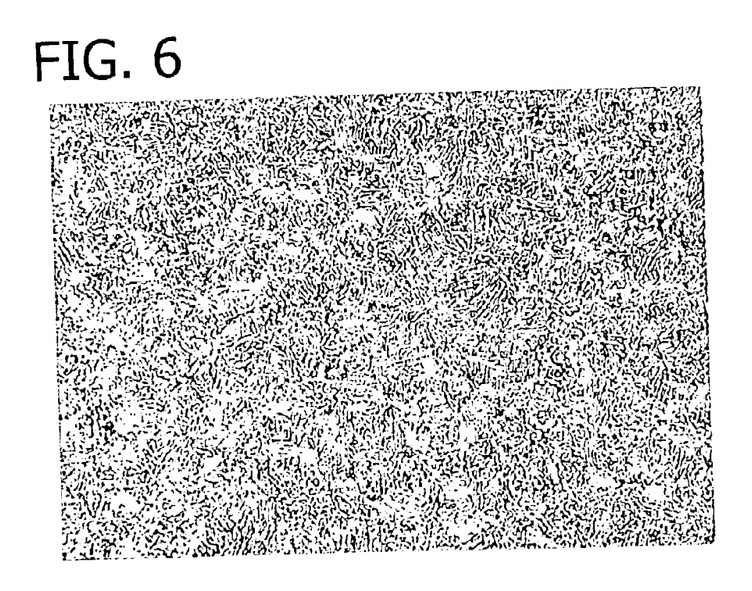
FIG. 6 is a photomicrograph taken at a magnification of 100× illustrating HIP-consolidated titanium microstructure.
Figure 7:
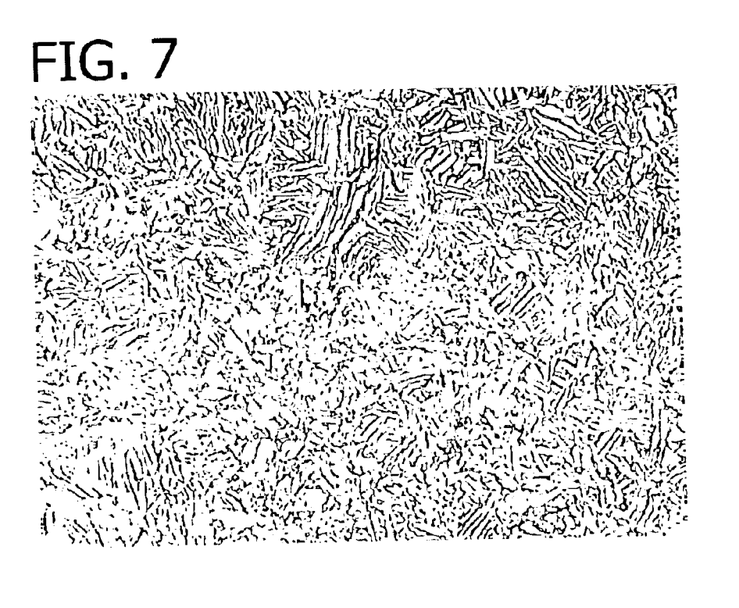
FIG. 7 is a photomicrograph taken at a magnification of 200× illustrating HIP-consolidated titanium microstructure.

The horn or other acoustical energy transfer component of the invention operates in a uniform breathing mode in that it expands and contracts isotropically, that is, uniformly in all directions, and at least in a desired direction. As such, in the instance of a horn, it uniformly applies energy to successive work pieces. To achieve this uniform expansion and contraction, the horn is prepared to have a microstructure which has substantially isotropic and random grain alignment. This isotropic alignment is especially evident from examination of the microstructures depicted in FIGS. 4–7. The microstructures in FIGS. 4 and 5 illustrate non-isotropic grain alignment, i.e., an overall appearance of substantial alignment of grains generally in one direction, which in these figures is generally horizontal. This is illustrative of non-isotropic grain alignment, which can be exhibited in forged materials, such as forged titanium. FIGS. 6 and 7, in contrast, demonstrate isotropic directional grain alignment according to the invention and, in particular, of hot isostatically pressed titanium powder. In particular, no majority of the grains are aligned in one direction. The number of grains aligned in each direction is roughly equal in all directions. No substantially disproportionate share of grains is aligned in any one direction. There is no preferential alignment of grains in any one direction. The directional alignment of grains is substantially random.

It has been discovered that by use of a component body which has a microstructure characterized by these features, the component body expansion and contraction are substantially uniformly isotropic, that is, the amplitude of expansion and contraction is substantially the same in all directions upon excitation at, for example, a frequency between about 15 and about 60 kHz. In one embodiment the expansion and contraction is at least about 80% uniform in that the minimum amplitude of expansion and contraction in any direction is at least about 80% of the maximum amplitude of expansion and contraction in any direction. In another embodiment the expansion and contraction amplitude is at least about 90% uniform, and in another embodiment it is at least about 95% uniform. In particular, for example, the variation in amplitude of the expansion and contraction measured along the entire radial surface of the horn embodiment of the invention is less than about 10% of the maximum amplitude at any point on the radial surface. More specifically, for example, if the maximum amplitude is A-max where A-max is a value between about 0.002 inches (0.005 cms) and about 0.008 inches (0.020 cms), the difference between the maximum amplitude and the minimum amplitude is less than about 0.1 times (A-max).

The microstructure is relatively uniform in terms of grain shape. For example, in one embodiment about 70% of the grains are elongated in that they have a length at their longest point which is at least about six times their width at their widest point. While this is an estimated number, it helps illustrate what is considered to be relatively uniform in terms of grain shape.

Figure 8:
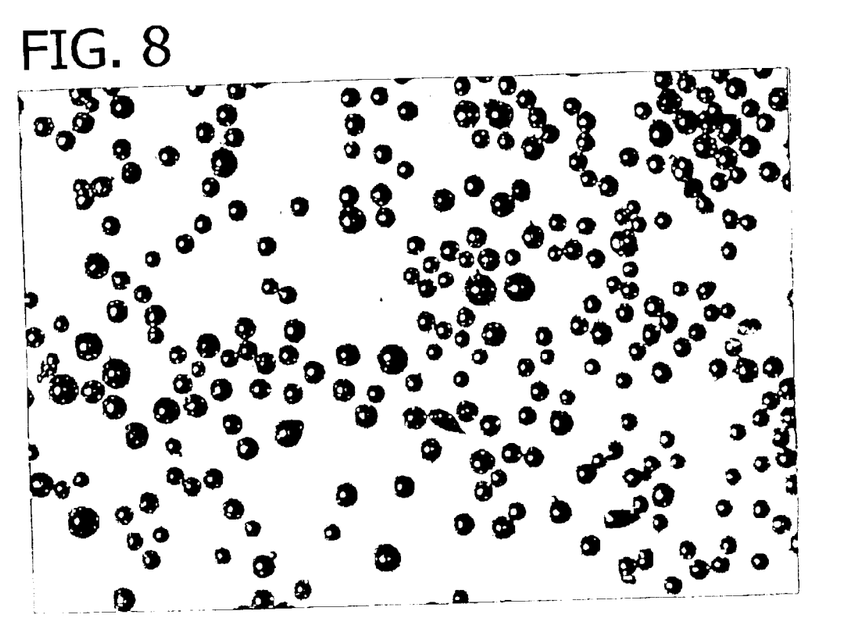
FIG. 8 is a photomicrograph illustrating titanium powder.

In one specific embodiment, the desired microstructure can be achieved by a powder metallurgical process in which metal powder is formed into the acoustical energy transfer component preform shape by filling the powder into a mold, and then consolidated by hot isostatic pressing, also known as HIP-consolidation. The powder can be a titanium-based material, such commercially pure titanium or a titanium alloy (e.g., Ti6Al4V). FIG. 8 illustrates a high purity titanium powder of the type which can be used in the manufacture of HIP-consolidated components.

After filling the powder into the acoustical energy transfer device preform mold, the preform is hot isostatically pressed to consolidate the metal powder. The hot isostatic pressing operation can be carried out employing a pressure vessel which can be pressurized employing a gas, such as argon, of commercial quality to apply a pressure equally over the entire surface area of the component body. The pressure, in combination with the elevated temperature employed, effects consolidation of the metal powder to a density of at least about 95%, at least about 99%, and even about 100% of the theoretical density of the metal.

For the hot isostatic pressing, a pressure suitable for use in this operation can be, for example, about 16 ksi. The temperature employed in this operation can be in the range of about 1500 F (about 815 C) to about 1600 F (about 870 C). The duration of the hot isostatic pressing step depends upon the temperature and pressure selected. As a general proposition, when the pressure is 16 ksi and the temperature is in the range of about 1500 F (about 815 C) to about 1600 F (about 870 C), the process may employ a time period of about 1.5 hrs to about 3 hrs, for example 2 hrs, in one embodiment. At the conclusion of the hot isostatic pressing step, the component body is cooled and removed from the pressure vessel.

The isostatically pressed component is then optionally subjected to final machining operations to impart the desired shape and surface characteristics.

Figure 9A:
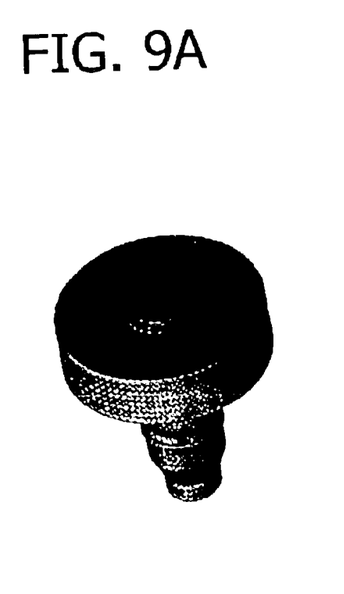
FIGS. 9A and 9B are schematic representations comparing an ultrasonic rotary horn under isotropic breathing conditions to an ultrasonic rotary horn under non-isotropic breathing conditions.
Figure 9B:
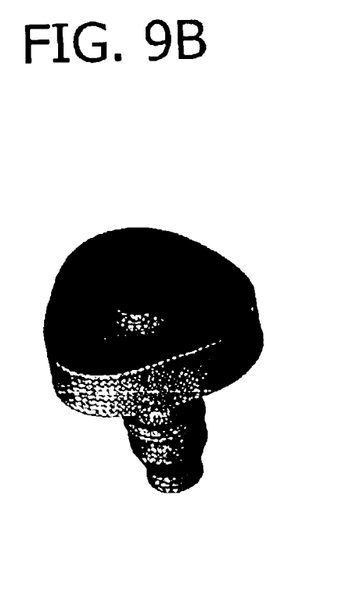

The fact that there is no preferential alignment of grains in any one direction, and that the directional alignment of grains is substantially isotropic and random, yields a component which expands relatively uniformly in all radial directions, in contrast to forged components which expand relatively non-uniformly in various directions, as is schematically illustrated in FIGS. 9A and 9B. This more relatively uniform expansion characteristic illustrated in FIG. 9A results in increased uniformity in the work being performed. For example, where the component is a horn used for bonding, more uniform bonding results because the energy supplied is more uniform no matter where the horn is in its rotation cycle.

The component of the invention in certain physical embodiments where mechanical-type work is performed can also be characterized by reduced maintenance requirements in that the uniformity of expansion and contraction can reduce the incidence of wear and deformation on the working surface, because there are not areas of substantially differing impact force.

A further advantage of the present invention is that the need for tuning the.component can be eliminated or substantially reduced. In particular, it has been discovered that a HIP-consolidated microstructure of the invention has a more consistent resonant operating frequency from component to component than does a forged microstructure. As such, a HIP-consolidated horn or other component of a specific predetermined configuration diameter will much more consistently and predictably have a resonant operating frequency of, for example, 20,000 Hz. Accordingly, a 20,000 Hz horn or other component can more reliably be produced by simply machining directly to this predetermined configuration, without the need to produce it oversize and gradually machine it to reduce its diameter until the proper frequency is achieved. This is believed to be due to the fact that the HIP-consolidated material has a grain size distribution and grain alignment which does not vary substantially from one component to the next, as does the grain size distribution and,grain alignment of forgings.

It has been discovered that HIP-consolidation is especially suited for manufacture of the components of the invention because it yields the isotropic microstructure of conventional powder metal sintering, without a sacrifice in density which accompanies sintering; and that it achieves the density of forging, without the non-istropic microstructure of forging.

A further advantage of the present invention is the avoidance of undesired coupling of operating modes which is sometimes present with forged components. In particular, the directional alignment of grains in a forged component results in coupling or linkage of more than one mode of potential expansion and contraction upon excitation. Under certain operating conditions more than one of these modes can be manifested, resulting in non-uniform expansion and contraction. In some instances where a large number of modes are coupled, the component may not even operate, rendering it scrap. Components forged from a highly directional billet, for example, may have as high as a 30% scrap rate. In contrast, the HIP-consolidated component of the invention operates in only one mode, that being the mode for which it is designed according to acoustical design principles, due to its microstructure being isotropic, such that undesired coupling of more than one operational mode is avoided.

A still further advantage of the present invention is that each successive HIP-consolidated component has essentially the same microstructure. As such, each one will have essentially the same operational mode, thus lending predictability to the manufacturing process. In contrast, forgings do not have as consistent microstructure from one forging to the next, such that the operation modes, or primary expansion and contraction characteristics, vary from one forging to the next.

The foregoing aspects of the invention are further illustrated in the following example.

EXAMPLE

Figure 10:
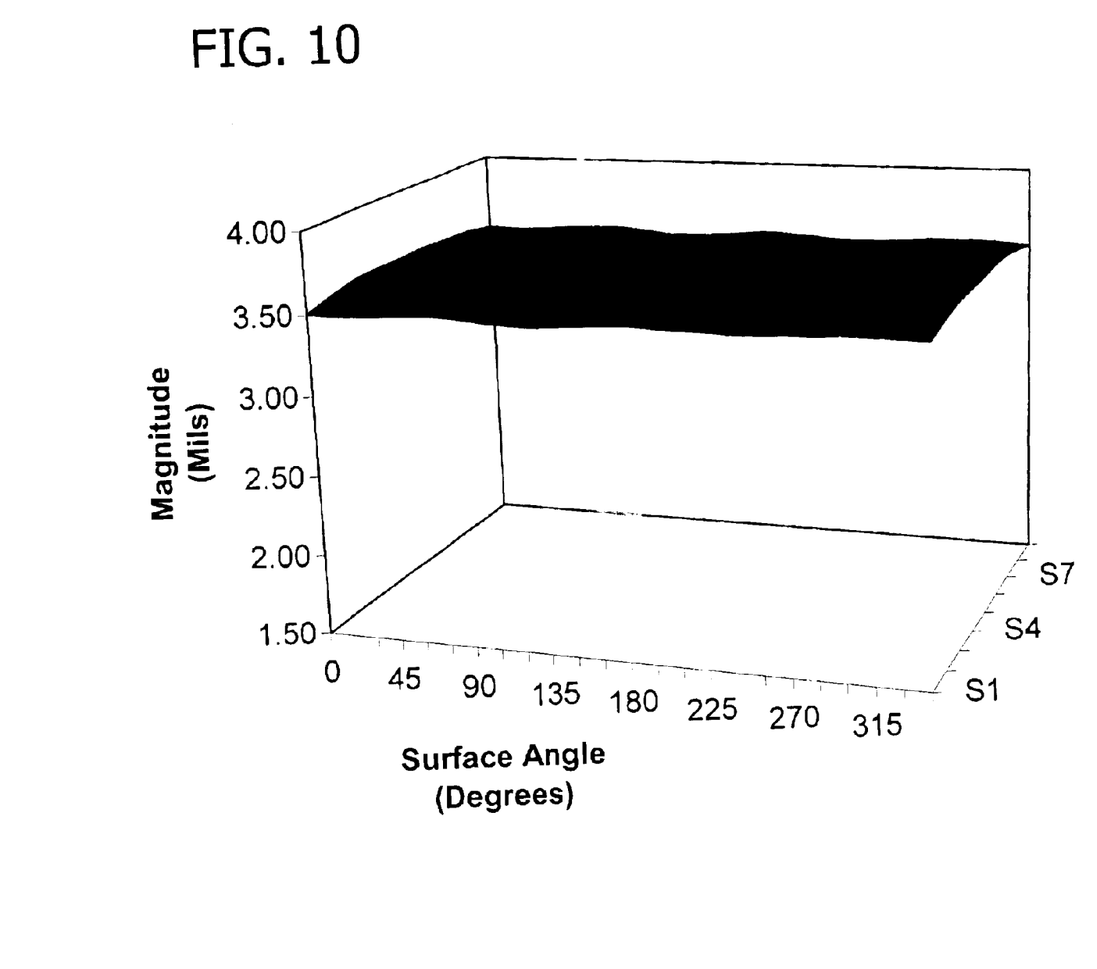
FIG. 10 is a radial amplitude surface map of an ultrasonic rotary horn made from HIP-consolidated titanium powder.
Figure 11:
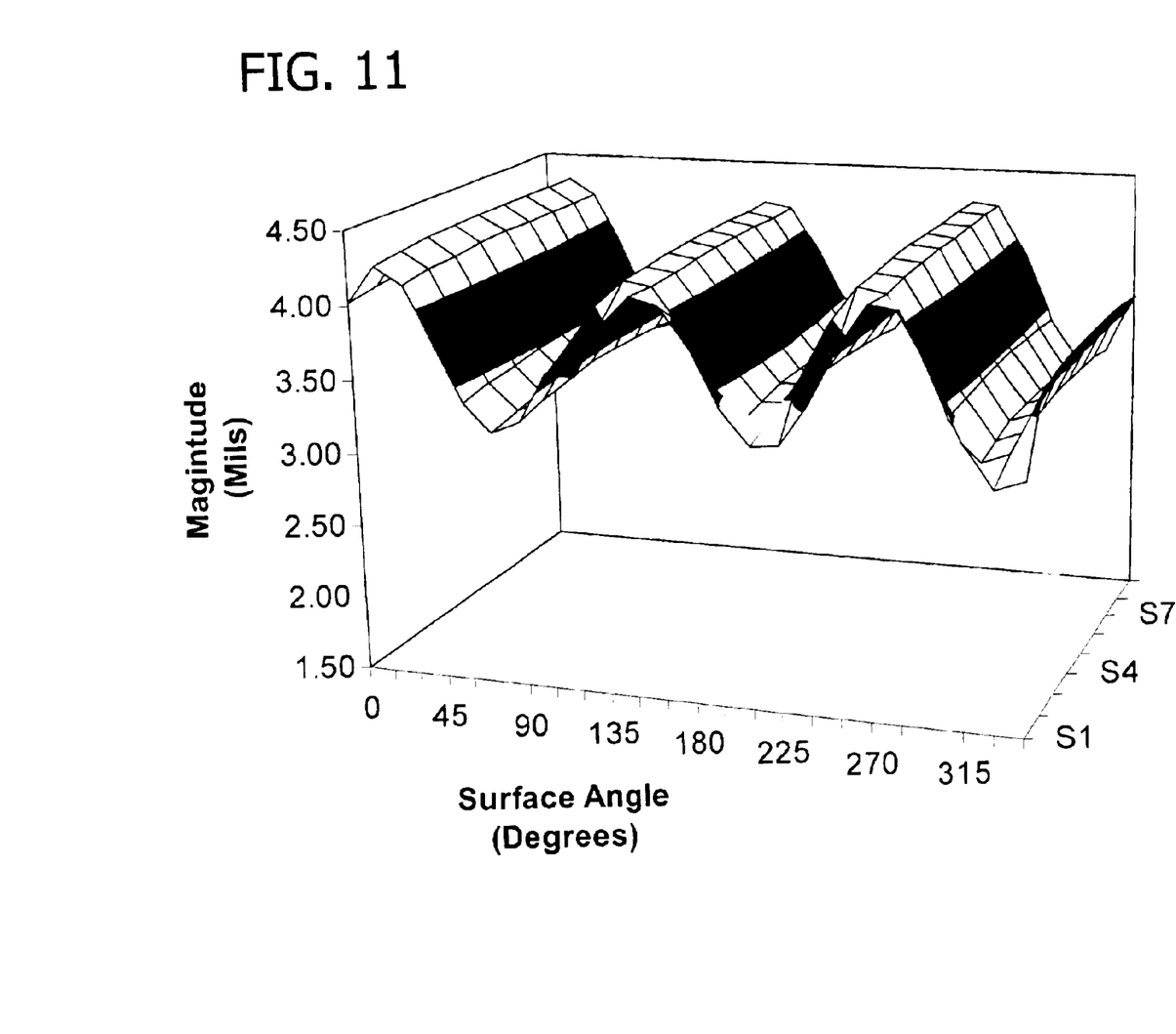
FIG. 11 is a radial amplitude surface map of an ultrasonic rotary horn made from forged titanium.

An ultrasonic rotary horn of the invention having a HIP-consolidated microstructure with generally random isotropic grain alignment was tested at 20,000 Hz to determine the variation in its amplitude of expansion and contraction, i.e., whether it expands and contracts generally uniformly and isotropically in all radial directions. An ultrasonic rotary horn having a forged microstructure was similarly tested for comparison. Each horn was assembled into a rotary horn stack assembly having the horn, a 1.5-gain Dukane booster (Part 110-2512), and a Dukane converter (Part 110-3716-001). Each horn was energized and the frequency was permitted to stabilize to plus or minus about 5 Hz. An amplitude sensor probe (Kaman Instrumentation Corp., Middletown, Conn., Part No. KD-4200) was applied to measure the amplitude of displacement of the horn adjacent a first edge, and the horn was rotated so an amplitude reading was taken every 15 degrees of rotation. After the entire circumference was measured at the edge, the measuring process was repeated at a parallel location about 0.2 inches (0.5 cms) frolic the edge, and around the entire circumference. This was repeated along nine circumferential parallels to produce the data in the Appendix and plotted in FIGS. 10 and 11. The amplitude for the forged horn ranged from a low of about 0.00309 inches (about 0.075 cms) to a high of about 0.00433 inches (about 0.011 cms). The difference between the high and the low constituted about 0.00124 inches (0.0031 cms), which is roughly 28% of the high amplitude of 0.0433 inches (0.11 cms). These data also show that the amplitude for the HIP-consolidated horn ranged from a low of about 0.00349 inches (0.0089 cms) to about 0.00361 inches (0.0091 cms). The difference between the high and the low constituted about 0.00012 inches (0.0003 cms), which is only about 3% of the high of 0.00361 inches (0.0092 cms). As illustrated in the FIGS. 10 and 11 plots, the HIP-consolidated horn had much more uniform and isotropic radial expansion and contraction characeristics.

As various changes could be made in the above-described horn and horn assembly without departing from the scope of the invention, it is intended that all matter contained in the above description be interpreted as illustrative and not in a limiting-sense.

What is claimed is:

1. An acoustical energy transfer component for transporting acoustical energy, the component comprising a shaped metal component body having a substantially uniformly isotropic expansion and contraction amplitude upon acoustical excitation, wherein the expansion and contraction amplitude is least about 90% uniform.

2. The acoustical energy transfer component of claim 1 wherein the expansion and contraction amplitude is at least about 95% uniform.

3. The acoustical energy transfer component of claim 1 wherein the expansion and contraction amplitude is at least about 97% uniform.

4. The acoustical energy transfer component of claim 1 wherein the expansion and contraction amplitude of at least about 90% uniformity occurs at a frequency between about 15,000 Hz and about 60,000 Hz.

5. The acoustical energy transfer component of claim 1 characterized by a maximum expansion and contraction amplitude of between about 0.002 inches (0.005 cms) and about 0008 inches (0.020 cms) upon excitation at a frequency between about 15,000 Hz and about 60,000 Hz.

6. The acoustical energy transfer component of claim 1 wherein the component body is manufactured by a process comprising hot isostatic pressing.

7. The acoustical energy transfer component of claim 4 wherein the component body is manufactured by a process comprising hot isostatic pressing.

8. The acoustical energy transfer component of claim 5 wherein the component body is manufactured by a process comprising hot isostatic pressing.

9. The acoustical energy transfer component of claim 1 wherein the component body has a microstructure characterized by isotropically random directional grain alignment.

10. The acoustical energy transfer component of claim 2 wherein the component body has a microstructure characterized by isotropically random directional grain alignment.

11. The acoustical energy transfer component of claim 4 wherein the component body has a microstructure characterized by isotropically random directional grain alignment.

12. The acoustical energy transfer component of claim 5 wherein the component body has a microstructure characterized by isotropically random directional grain alignment.

13. The acoustical energy transfer component of claim 1 wherein the component body is manufactured from a titanium-based material.

14. The acoustical energy transfer component of claim 2 wherein the component body is manufactured from a titanium-based material.

15. The acoustical energy transfer component of claim 4 wherein the component body is manufactured from a titanium-based material.

16. The acoustical energy transfer component of claim 5 wherein the component body is manufactured from a titanium-based material.

17. An acoustical energy transfer component for transporting acoustical energy, the component comprising a shaped metal component body having a substantially uniformly isotropic expansion and contraction amplitude upon acoustical excitation, wherein the expansion and contraction amplitude is at least about 90% uniform, and wherein the component body is hot isostatically pressed from a metal powder material and has a density which is about 100% of a theoretical density for the metal powder.

18. The acoustical energy transfer component of claim 1 wherein the component body is an ultrasonic booster.

19. An acoustical energy transfer component for transporting acoustical energy, the component comprising a shaped metal component body having a microstructure characterized by isotropically random directional grain alignment, wherein the expansion and contraction amplitude of the component is at least about 97% uniform.

20. The acoustical energy transfer component of claim 19 wherein the expansion and contraction amplitude of at least about 97% uniformity occurs at a frequency between about 15,000 Hz and about 60,000 Hz.

21. The acoustical energy transfer component of claim 19 characterized by a maximum expansion and contraction amplitude of between about 0.002 inches (0.005 cms) and about 0.008 inches (0.020 cms) upon excitation at a frequency between about 15,000 Hz and about 60,000 Hz.

22. The acoustical energy transfer component of claim 19 wherein the component body is manufactured by a process comprising hot isostatic pressing.

23. The acoustical energy transfer component of claim 19 wherein the component body is an ultrasonic booster.

24. A method for manufacturing an acoustical energy transfer component for transporting acoustical energy, the method comprising:

mechanically pressing metal powder into a component body preform; and hot isostatically pressing the component body preform to consolidate the metal powder to form a shaped solid metal component body having a uniform isotropic microstructure characterized by randomly isotropic directional grain alignment such that the component body has a uniformly isotropic expansion and contraction amplitude upon acoustical excitation, wherein the expansion and contraction amplitude is at least about 90% uniform.

25. The method of claim 24 wherein the metal powder is titanium-based.

26. The method of claim 24 wherein the shaped solid metal body has a density which is about 100% of a theoretical density for the metal powder.

27. An acoustical energy transfer component for transporting acoustical energy, the component comprising a shaped metal component body consisting of Ti metal or Ti metal alloy formed by hot isostatically pressing a powder metallurgical preform such that the component has a microstructure characterized by isotropically random directional grain alignment and substantially uniformly isotropic expansion and contraction amplitude upon acoustical excitation.

28. The acoustical energy transfer component of claim 27 wherein the shaped metal component body has an expansion and contraction amplitude which is at least about 90% uniform.

29. An acoustical energy transfer component for transporting acoustical energy, the component comprising a shaped metal component body having a substantially uniformly isotropic expansion and contraction amplitude in all directions upon acoustical excitation.

* * * * *

UNITED STATES PATENT AND TRADEMARK OFFICE
CERTIFICATE OF CORRECTION

PATENT NO. : 6,758,925 B1
DATED : July 6, 2004
INVENTOR(S) : Stegelmann

It is certified that error appears in the above-identified patent and that said Letters Patent is hereby corrected as shown below:

Column 7,
Line 46, "non-istropic" should read -- non-isotropic --.

Column 8,
Line 31, "frolic the edge," should read -- from the edge, --.
Line 52, "limiting-sense." should read -- limiting sense. --.

Column 9,
Line 6, "0008" should read -- 0.008 --

Signed and Sealed this

First Day of March, 2005

JON W. DUDAS
*Director of the United States Patent and Trademark Office*